Figure 7:
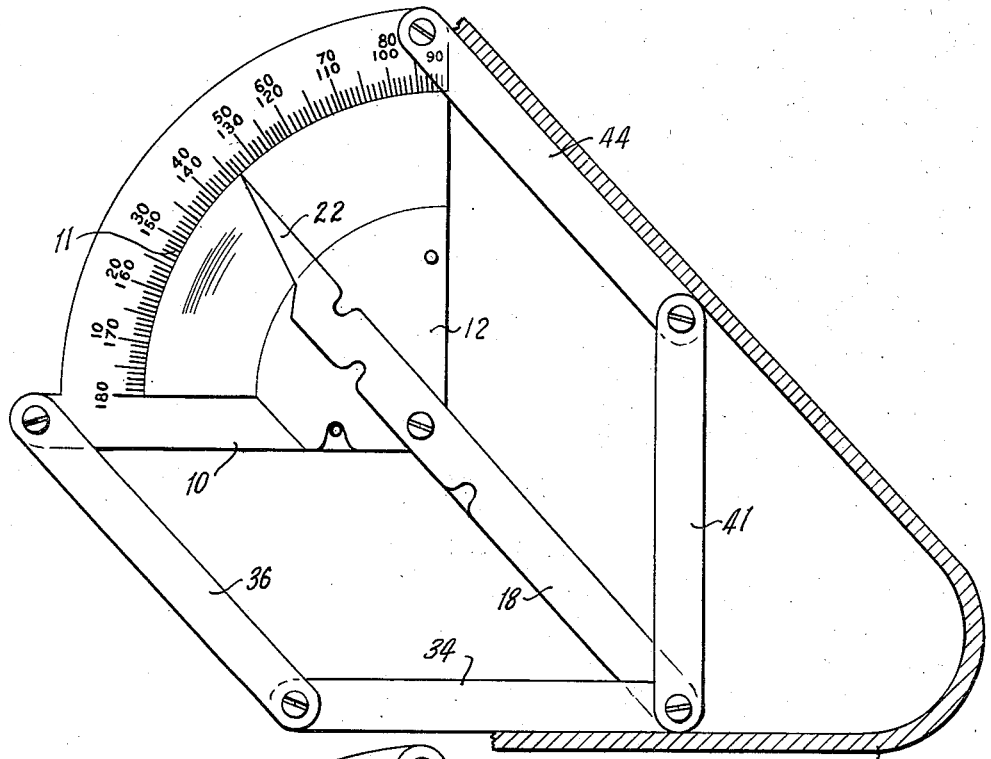

Aug. 19, 1952     H. S. WIEDEBUSCH     2,607,121
ANGLE MEASURING INSTRUMENT
Filed July 3, 1948     2 SHEETS—SHEET 1
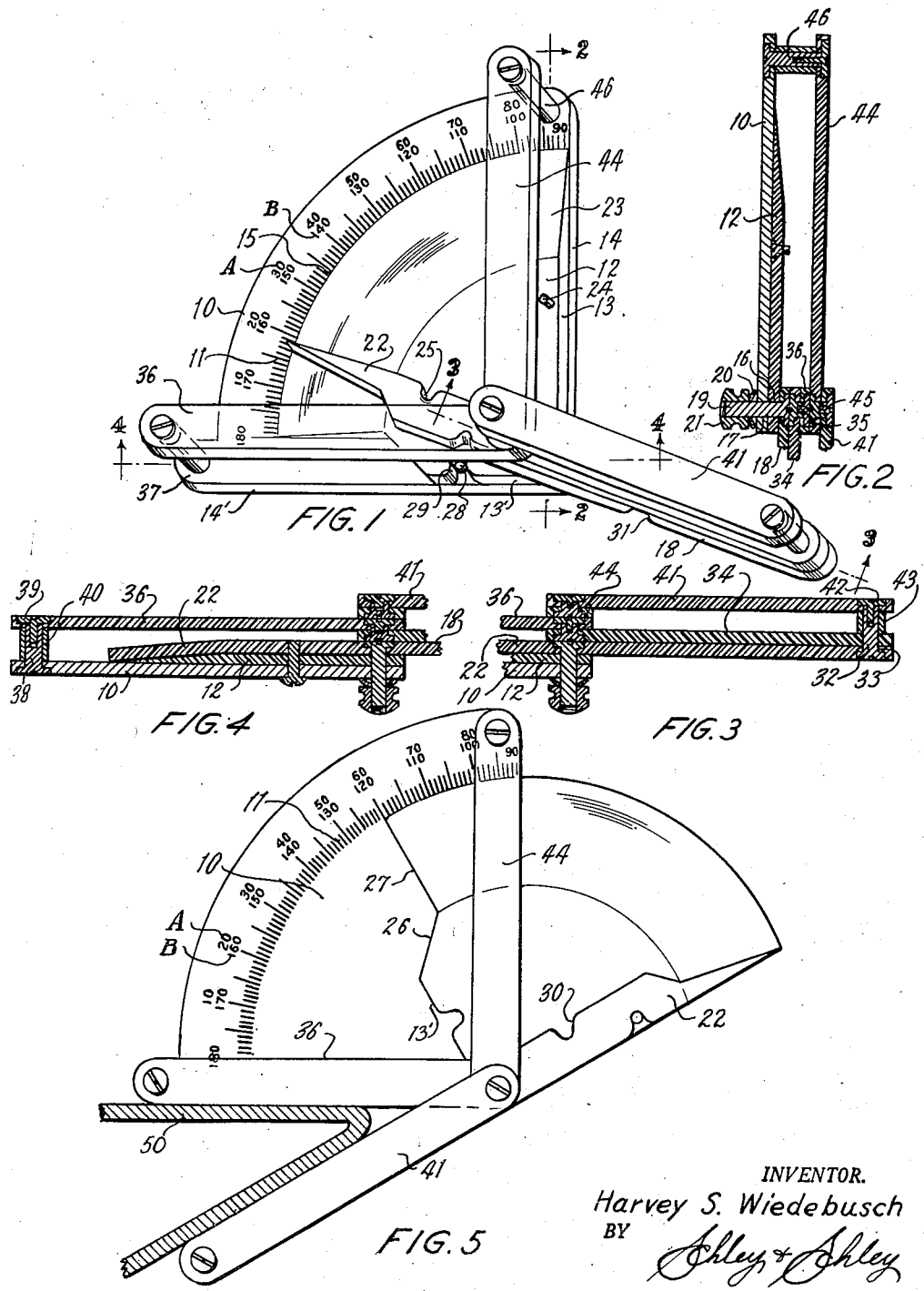
INVENTOR.
Harvey S. Wiedebusch
BY
Ashley & Ashley
ATTORNEYS INVENTOR.
Harvey S. Wiedebusch
BY Ashley & Ashley
ATTORNEYS Patented Aug. 19, 1952

2,607,121

UNITED STATES PATENT OFFICE 2,607,121

ANGLE MEASURING INSTRUMENT

Harvey S. Wiedebusch, Dallas, Tex., assignor of twenty-five per cent to Hubert M. Wigley, Dallas, Tex.

Application July 3, 1948, Serial No. 37,001

6 Claims. (Cl. 33—91)

This invention relates to new and useful improvements in angle measuring instruments.

An important object of the invention is to provide an improved angle measuring instrument which may be employed to measure angles from 0° to 180° between adjacent surfaces such as the walls of metallic ducting and the like.

A particular object of the invention is to provide an improved angle measuring instrument which will permit the measurement of both inside and outside obtuse and acute angles.

Yet another object of the invention is to provide an improved angle measuring instrument which is compact in structure and simple in operation, and which is easily and economically manufactured.

A further object of the invention is to provide an improved angle measuring instrument having a parallelogram arrangement of its measuring legs whereby certain of said legs may be extended to permit the measuring of angles between objects which are difficult of access.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is an isometric view of an angle measuring instrument constructed in accordance with this invention, Figs. 2, 3 and 4 are transverse sectional views taken upon the respective lines of Fig. 1, and Figs. 5, 6 and 7 are front elevational views illustrating the application of the instrument in the measurement of various angles.

In the drawings, the numeral 10 designates a quadrant-shaped plate which may be formed of metal, or plastic, transparent or otherwise, or any other suitable material, and which carries an arcuate scale 11 upon its upper face adjacent its curved side. The scale 11 is marked off in suitable indicia such as in degrees from 0 to 90 in one direction to its high end and from 90 to 180 in the opposite direction to its low end. Thus, the scale may be employed for reading both acute and obtuse angles. A second quadrant 12 overlies the quadrant plate 10 and has its right and left-hand lateral edges 13 and 13', respectively, vertically alined with the right and left-hand lateral edges 14 and 14', respectively, of said plate 10. The quadrant 12 is smaller than the plate 10 whereby its arcuate or curved edge 15 is disposed radially inwardly from the arcuate edge of the plate 10, and substantially overlies the inner portion of the scale 11. The quadrant 12 is movable with respect to the plate 10 and carries an opening 16 extending transversely through the quadrant at a point adjacent its apex and equidistantly spaced, or at the center of, the arcuate edge 15. A similar opening 17 is provided in the plate 10 in vertical alinement with the opening 16. An elongate handle 18 has a screw-threaded bolt 19 extending transversely of its inner end and through the openings 16 and 17. The head of the bolt is countersunk or recessed into the material of the handle 18, and the screw-threaded shank of the bolt projecting beneath the plate 10 receives a tension or friction washer 20 and a nut 21. With this structure, the handle, the quadrant 12 and the plate 10 are free to pivot upon the bolt 19 independently of one another, but the friction washer 20 tends to hold the various elements in their adjusted, angular position with respect to one another. In addition, the nut 21 may be tightened by hand to lock the elements in position.

An integral, elongate pointer 22 extends axially from the handle 18 and has its extremity vertically alined with the scale 11. The portion of the pointer adjacent said scale is bent downwardly as illustrated in Fig. 4, and the quadrant 12 is chamfered at 23 to make provisions for such downwardly directed portion of the pointer. Thus, as the handle 18 is swung upon the bolt 19, the pointer is successively brought into vertical alinement with various of the indicia of the scale 11. Employing this structure, outside angles from 90° to 180° may be measured between the right-hand edge 14 of the plate 10 and the upper side of the handle 18. The observed angle is determined by adding 90° to the reading observed upon the outer scale A, the pointer 22 serving to indicate said reading.

Angles from 180° to 90° may be read directly upon the inner scale B between the lower edge of the handle 18 and the lower straight side 14 of the plate 10. In this instance, a direct rather than a calculated reading is obtained.

Provision is made for the observation or measurement of angles less than 90° by means of the quadrant 12. The quadrant is provided with a short upstanding pin 24 adjacent its right-hand edge 13, as viewed in Fig. 1, and the pointer 22 is formed with a cut-out portion or notch 25 adapted to receive the pin 24 as the pointer is swung into alinement with said right-hand edge of the quadrant. In this position, the handle 18 is at 180° with respect to the right-hand edge 14 and the right-hand edge 13 of the quadrant plate 10 and the quadrant 12, respectively, and additional movement of the handle 18 in a clockwise direction will result in movement of the quadrant 12 upon the bolt 19 by reason of the engagement of the pin 24 within the notch 23. The left-hand or bottom edge 13' of the quadrant 12 is cut away at 26 to provide a radial edge or side 27 extending normal to the arcuate edge 15 of said quadrant. The depth of the cut-out is such as to position the edge 27 in alinement with the zero end of the scale 11 when the right-hand edge 13 of the quadrant is in alinement with the 90° end of said scale. Thus, the edge 27 may be used in lieu of the pointer 22 for obtaining readings from said scale as the handle 18 is rotated in a counter-clockwise direction beyond its alined position with respect to the right-hand edge 14 of the plate 10. This position of the measuring instrument is shown in Fig. 5 in which the pointer 22 has been swung off the scale 11, but the edge 27 continues to function as a pointer and permit a reading of said scale. The actual reading is obtained by subtracting 90° from the inner scale B, the example shown in Fig. 5 illustrating and a reading of an outside angle of 30°.

When the handle 18 is again swung in a counterclockwise direction about the bolt 19 to return the quadrant 12 to its retracted position as illustrated in Fig. 1, it is necessary to make provision for limiting the counterclockwise travel of said quadrant to the point at which it becomes realined with the quadrant plate 10. For this purpose, a short upstanding pin 28 projects upwardly from the surface of the plate 10 near the lower or left-hand edge 14' thereof. The pin 28 is received within a complementary notch 29 cut within the lower or left-hand edge 13' of the quadrant. The pin 29 projects above the quadrant, and also limits the counterclockwise movement of the pointer 22 by engaging within a notch 30 provided within said pointer upon its lower or left-hand edge and disposed between the cut-out portion 26 and the bolt 19. The provision of the pin 28 necessitates an additional notch 31 cut in the lower or left-hand edge of the handle 18 intermediate its ends and adapted to receive the pin 28 when the instrument is used to measure very small angles as indicated in Fig. 5. In swinging the handle 18 in a clockwise direction as far as possible, in the measuring of very small angles, the lower or left-hand edge of said handle would engage the pin 28 if the notch 31 were not provided.

Figure 6:
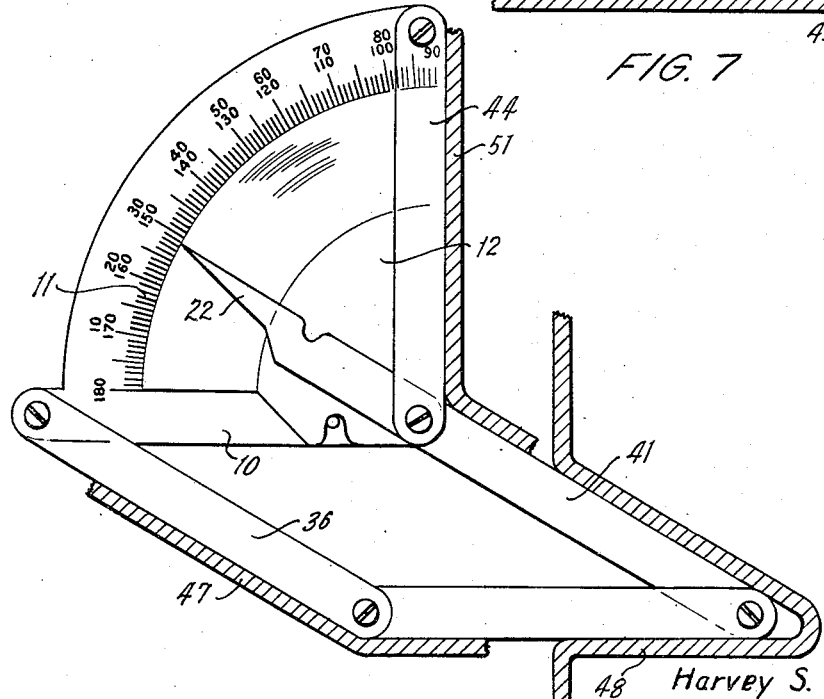

A double pair of parallelogram arms are also provided on the instrument for the measurement of additional angles. The first pair of arms is mounted immediately above the handle 18 which carries an upstanding, transverse bolt 32 in its outer end. The shank of the pin 32 is received within an opening 33 in the outer end of an elongate arm or bar 34 similar to the handle 18. In the position of the instrument shown in Figs. 1 and 5, the inner end of the bar 34 is disposed immediately above the head of the bolt 19, and is pivoted at that point by a suitable fastener 35 to the inner end of a second arm or bar 36, the latter extending parallel to the lower or left-hand edge 14' of the plate 10 to the zero end of the scale 11. The plate carries a radially outwardly projecting ear 37 adjacent the zero end of the scale 11, and a pivot pin 38 projects upwardly from said ear. The outer end of the bar 36 is pivoted upon the upper end of the pin 38 and secured thereto by a suitable screw 39, a sleeve 40 confined upon the pin 38 serving to space the outer end of the bar 36 above the surface of the plate 10. With this structure, the bar 36 is positioned parallel and spaced above in vertical alinement with the left-hand or lower edge portion of the plate 10. The centers of the pivot points of the arm 36 upon the pin 38 and the fastener 35 are spaced apart a distance equal to the distance upon the plate 10 between the center of the pin 38 and the center of the bolt 19. This spacing is also equal to the distance between the fastener 35 and the pin 32 upon the bar 34 and the distance along the handle 18 between the centers of the bolt 19 and said pin 32. Thus, four arms of equal length are provided by the bars 34 and 36, the handle 18, and the lower or left-hand portion of the plate 10. This structure permits the utilization of the instrument as illustrated in Fig. 6. By swinging the pointer 22 to the zero end of the scale and then swinging the bar 36 in a clockwise direction as the handle 18 is again moved in a clockwise direction, the fastener 35 is shifted from vertical alinement with the pin 19, and the parallelogram structure is opened as illustrated in Fig. 6. Because all sides of the parallelogram are equal, said sides will retain certain fixed relationships with respect to the other portions of the instrument as the arm 18 is moved into various angular positions. The bar 34 will remain parallel to the lower or left-hand edge 14' of the plate 10, while the arm 36 will remain parallel to the handle 18. All of the bars and the handle have straight parallel edges, and a true parallelogram structure is thus provided. Large inside angles may be measured between the bars 34 and 36, and small inside angles may be measured between the handle 18 and the bar 34 as illustrated in Fig. 6. At the same time, the right-hand edge 14 of the plate 10 and the upper edge of the handle 18 continue to function to permit the measurement of large outside angles. The rotation of the handle 18 in a clockwise direction may be continued beyond 180° to cause the quadrant 12 to shift or rotate with respect to the quadrant plate 10, but no particular advantage is achieved from this operation other than the measurement of certain inside angles in the neighborhood of 90°.

The second parallelogram structure is pivoted upon the instrument above the first structure described and includes a bar 41 having its outer ends secured upon the upper end of the pin 32 by means of a screw 42, the bar 41 being spaced above the bar 34 by means of a sleeve 43 confined upon the pin 32. The inner end of the bar 36 is connected to the inner end of a bar 44 by means of a fastener 45 similar to the fastener 35. The upper surface of the bar 44 abuts the undersurface of the bar 41, and the outer end of the bar 44 is pivoted upon an upstanding pin 46 positioned adjacent the 90° end of the scale 11 upon the quadrant plate 10. The structure of the pin 46 and the mounting of the bar 44 thereon is similar to that employed in the pin 38 which has the bar 36 mounted thereon. The bars 41 and 44 are substantially equal in length to the bars 34 and 36, and this second parallelogram structure may be brought into operation by swinging the pointer 22 to the 90° end of the scale. Then, as the handle 18 is rotated in a counterclockwise direction, the bar 44 may also be rotated in a counterclockwise direction to expand the instrument to the position shown in Fig. 7. Now, as the handle 18 is swung, the bar 44 remains parallel to the handle 18 and thus to the bar 36, while the bar 41 remains parallel to the right-hand edge of the quadrant plate 10, and therefore perpendicular to the bar 34. Additional inside angles may now be accurately measured with the instrument.

This instrument has many uses but is particularly advantageous in the measuring of various sheet metal structures such as tanks, air ducts and other structures in which metallic plates intersect at a variety of angles. It is often necessary to measure the various angles of such a structure in order to permit duplication or alteration work, and the present invention is particularly desirable for such use.

In general, there are four types of angles which must be measured, these being inside obtuse and acute angles, as illustrated at 47 and 48, respectively, in Fig. 6, and at 49 in Fig. 7. It is also necessary to measure outside acute angles, illustrated at 50 in Fig. 5, and outside obtuse angles illustrated at 51 in Fig. 6. Beginning in Fig. 5, it will be noted that outside acute angles from 0° to 90° may be measured between the lower edge of the plate 10 and the lower edge of the handle 18 with the pointer section 27 of the quadrant 12 serving to mark the observed angle upon the scale 11. The plates which comprise the angle 50 may be of any length without interfering with the operation of the instrument. However, if they are extremely short, the instrument will be difficult to place, and the better practice is to measure the angle from its inside or opposite side. Outside obtuse angles, as shown at 51 in Fig. 6 are likewise readily measured between the upper edge of the handle 18 and the right-hand edge of the plate 10. Again, the plates forming the angle 51 may be of any length or size without interfering with the instrument, but may prove difficult to apply the instrument to when they are extremely short. In such an instance, the angle is thus measured from the opposite side as an inside angle. Such a measurement is shown in Fig. 6 upon the angle 47, the bars 34 and 36 being employed for this purpose. In this instance, neither the length nor the shortness of the plates forming the angle 47 have any affect so long as the actual dimensional width of said arms does not become a limiting factor. Since the arms may obviously be made of any desired width, this latter problem does not readily occur.

Inside acute angles, such as angles 48 and 49, are measured between the upper side of the handle 18 and the arm 34, or may be measured between the arms 34 and 44 as illustrated in Fig. 7. If the plates forming the inside acute angle are relatively short, the method illustrated in Fig. 6 may be employed, and when the plates are of considerable length, the method illustrated in Fig. 7 is of advantage. Thus, it is seen that provision has been made for the accurate measurement and observation of all types of angles by means of the angle measuring instrument contemplated by this invention, and that substantially no instances occur in which the instrument may not be quickly, easily, and accurately employed for such measurement purposes.

Whenever angles are to be measured, the various bars of the instrument may be adjusted to the proper position to conform to the angle measured, and then the nut 21 may be tightened to lock the instrument frictionally in the adjusted position. The instrument may then be handled without danger of loss of the observed reading, and will retain this adjusted position until the nut 21 is loosened.

The materials from which the instrument is constructed are not particularly critical. However, it has been found to be of advantage to form the arms 36 and 44 of a suitable transparent material so that they will not obscure the ends of the scale 11.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An angle measuring instrument including, a base member having two intersecting outside edges perpendicular to one another, an arcuate scale extending between said edges having a low-reading end and a high-reading end, a handle pivotally mounted upon the base member at the center of curvature of the scale, a pointer carried by the handle extending from the point of connection to the scale, a second pointer pivotally mounted upon the base member concentrically with the first pointer and movable separately of the latter, said second pointer normally being alined with the low-reading end of the scale, a projection carried by one of the pointers engaging the other pointer when the first pointer is swung to the high-reading end of the scale to prevent further independent swinging of the first pointer beyond said end and cause the second pointer to move with the first as the latter is swung beyond the high-reading end of the scale, a first angle measuring bar having one end pivotally mounted upon the base member adjacent one outside edge thereof, a second angle measuring bar having one end pivotally mounted upon the base member adjacent the opposite outside edge thereof, a third angle measuring bar having one end pivotally connected to the free end of the first bar, and a fourth angle measuring bar having one end pivotally connected to the free end of the second bar, the opposite ends of the third and fourth bars being pivotally connected to the free end of the handle.

2. An angle measuring instrument as set forth in claim 1, wherein the first and third bars and the handle and one outside edge of the base member form one parallelogram, and the second and fourth bar and the handle and the opposite outside edge of the base member form a second parallelogram.

3. An angle measuring instrument including, a plate having an arcuate scale intersected by two rectilinear edges disposed substantially at right angles, the intersection of the rectilinear edges being contiguous the center of curvature of the scale, a handle pivotally mounted upon the plate at the center of curvature of the scale, a pointer carried by the handle and extending to the scale, an angle measuring bar having one end pivotally mounted upon the plate at one end of the scale closely adjacent the intersection of one rectilinear edge of the plate with the scale, and a second angle measuring bar having one end pivotally connected to the free end of the first bar, the opposite end of the second bar being pivotally connected to the free end of the handle, the length between the points of pivotal connection of the first bar to the plate and the second bar being substantially the same as the length between the points of pivotal connection of the plate to the first bar and the handle, the length between the points of pivotal connection of the second bar to the first bar and the handle being substantially the same as the length between the points of pivotal connection of the handle to the plate and the second bar.

4. An angle measuring instrument as set forth in claim 3, wherein the lengths between the points of pivotal connection of the first bar and the second bar are substantially equal.

5. An angle measuring instrument including, a plate having two intersecting edges perpendicular to one another, an arcuate scale on the plate extending between said edges, a handle pivotally connected to the plate at the center of curvature of the scale, a pointer carried by the handle extending from the point of connection to the scale, a second pointer pivotally connected to the plate at the center of curvature of the scale movable separately from the first pointer, a projection carried by one of the pointers engaging the other pointer when the two pointers are displaced from one another by a predetermined angle, a first angle measuring bar having one end pivotally mounted upon the plate adjacent one intersecting edge thereof, a second angle measuring bar having one end pivotally mounted upon the plate adjacent the opposite intersecting edge thereof, a third angle measuring bar having one end pivotally connected to the free end of the first bar, and a fourth angle measuring bar having one end pivotally connected to the free end of the second bar, the opposite ends of the third and fourth bars being pivotally connected to the free end of the handle.

6. An angle measuring instrument including, a quadrant plate having a scale along its arcuate edge, a handle pivotally mounted upon the plate at the center of curvature of the scale, a pointer carried by the handle extending from the point of connection to the scale, an angle measuring bar having one end pivotally mounted upon the plate at one end of the scale, a second angle measuring bar having one end pivotally connected to the free end of the handle, the opposite end of the second bar being pivotally connected to the free end of the first bar, a third angle measuring bar having one end pivotally mounted upon the plate at the opposite end of the scale, and a fourth angle measuring bar having one end pivotally connected to the free end of the third bar and its opposite end pivotally connected to the free end of the handle.

HARVEY S. WIEDEBUSCH.

REFERENCES CITED

The following references are of record in the file of this patent:

UNITED STATES PATENTS

| Number | Name | Date |
|---|---|---|
| 230,975 | Walters | Aug. 10, 1880 |
| 496,944 | Tostevin | Apr. 4, 1893 |
| 523,259 | Beeler | July 17, 1894 |
| 570,767 | Pennington | Nov. 3, 1896 |
| 776,325 | Hodge | Nov. 29, 1904 |
| 861,581 | Field et al. | July 30, 1907 |
| 1,095,552 | Colpitts | May 5, 1914 |
| 1,538,825 | Kooiman | May 19, 1925 |
| 1,872,578 | Hampton | Aug. 16, 1932 |
| 1,996,110 | Woods | July 10, 1934 |
| 2,054,503 | Jambura | Sept. 15, 1936 |
| 2,471,099 | Dethlefs et al. | May 24, 1949 |
| 2,480,914 | Gallington | Sept. 6, 1949 |

FOREIGN PATENTS

| Number | Country | Date |
|---|---|---|
| 825,448 | France | Mar. 3, 1938 |